United States Patent
Peiker

(10) Patent No.: US 9,077,191 B2
(45) Date of Patent: Jul. 7, 2015

(54) CHARGING ARRANGEMENT FOR A VEHICLE

(75) Inventor: Andreas Peiker, Friedrichsdorf (DE)

(73) Assignee: Peiker Acustic GmbH & Co. KG, Friedrichsdorf (DE)

( * ) Notice: Subject to any disclaimer, the term of this patent is extended or adjusted under 35 U.S.C. 154(b) by 419 days.

(21) Appl. No.: 13/488,789

(22) Filed: Jun. 5, 2012

(65) Prior Publication Data

US 2012/0313576 A1     Dec. 13, 2012

(30) Foreign Application Priority Data

Jun. 8, 2011   (DE) .......................... 10 2011 104 990
Aug. 19, 2011  (DE) .......................... 10 2011 110 680

(51) Int. Cl.
     *H02J 7/00*    (2006.01)
     *H02J 7/02*    (2006.01)

(52) U.S. Cl.
     CPC ............. *H02J 7/0044* (2013.01); *H02J 7/0047* (2013.01); *H02J 7/025* (2013.01)

(58) Field of Classification Search
     CPC ................................. H02J 7/025; H01F 7/247
     USPC ......................................................... 320/108
     See application file for complete search history.

(56) References Cited

U.S. PATENT DOCUMENTS 8,362,743 B2 * 1/2013 Andrieu et al. ............... 320/108
2010/0264871 A1 10/2010 Matouka et al.

FOREIGN PATENT DOCUMENTS

DE    10 2010 014 654 A1    12/2010

* cited by examiner

*Primary Examiner* — Thuan Do
(74) *Attorney, Agent, or Firm* — Burr & Brown, PLLC

(57) ABSTRACT

The present invention relates to a charging arrangement for a vehicle comprising an inductively chargeable mobile electronic appliance consisting of a multiplicity of different, inductively chargeable, mobile electronic appliances, having a secondary coil, charging electronics and a rechargeable battery and a charging device having a primary coil and a charging surface which is associated with the primary coil and above which the mobile electronic appliance can be placed down for charging. In this case, the primary coil can be fixed in a first primary position and in at least one second primary position on a primary plane relative to the charging surface, with the primary coil being fixed in the chosen primary position independent of shaking, vibrations or centrifugal forces acting on the charging arrangement, and independent of the presence of the mobile electronic appliance.

15 Claims, 14 Drawing Sheets

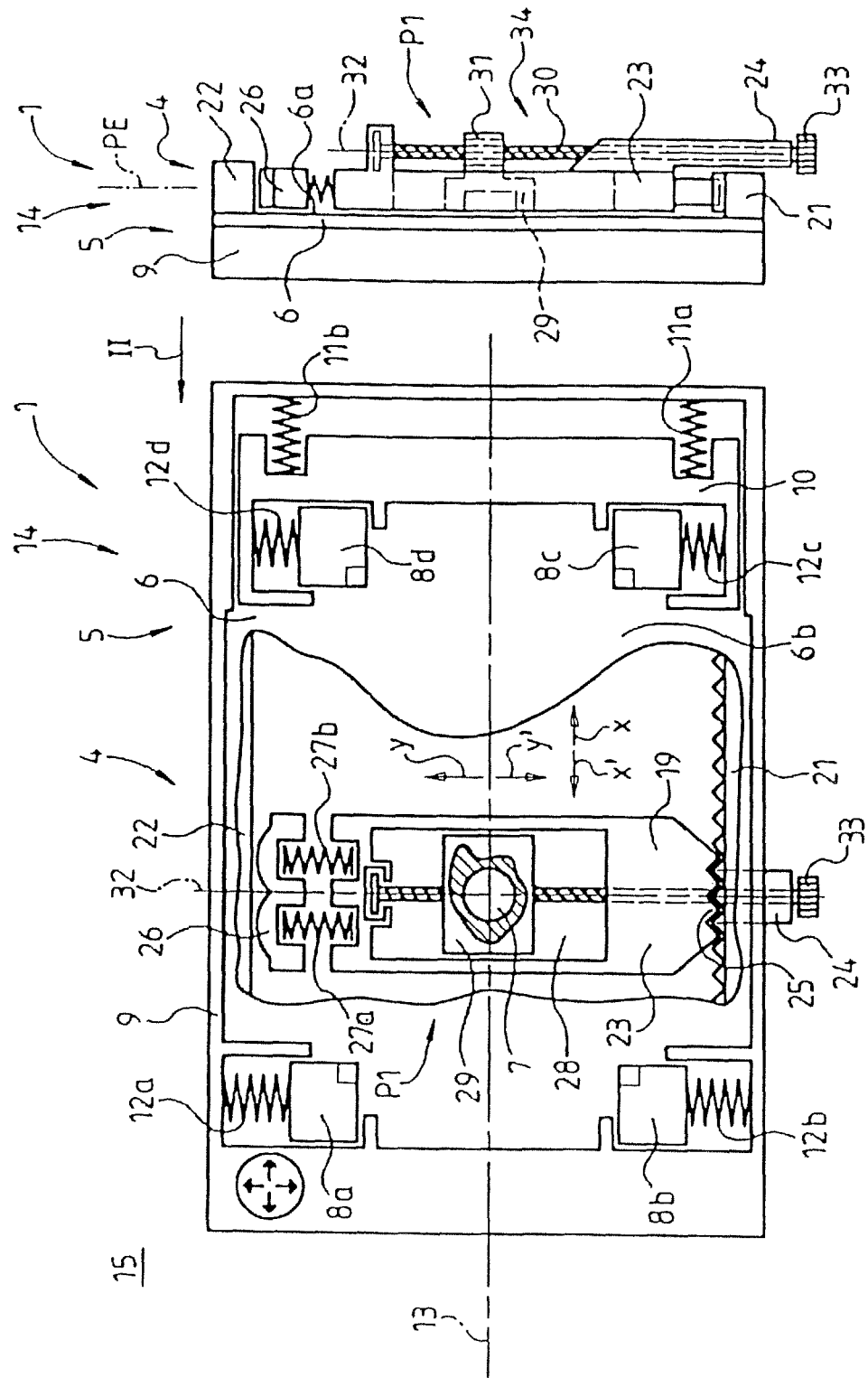

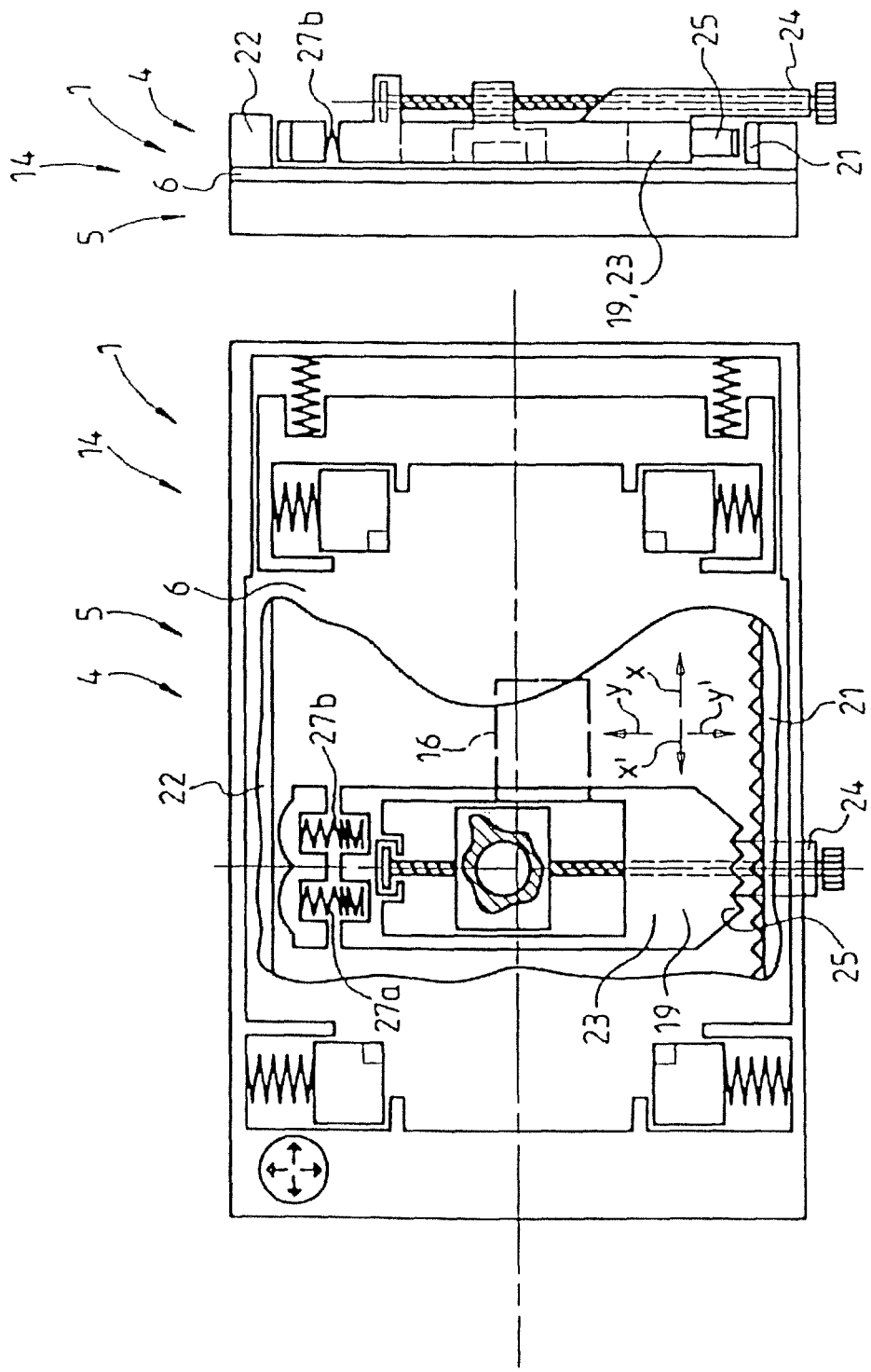

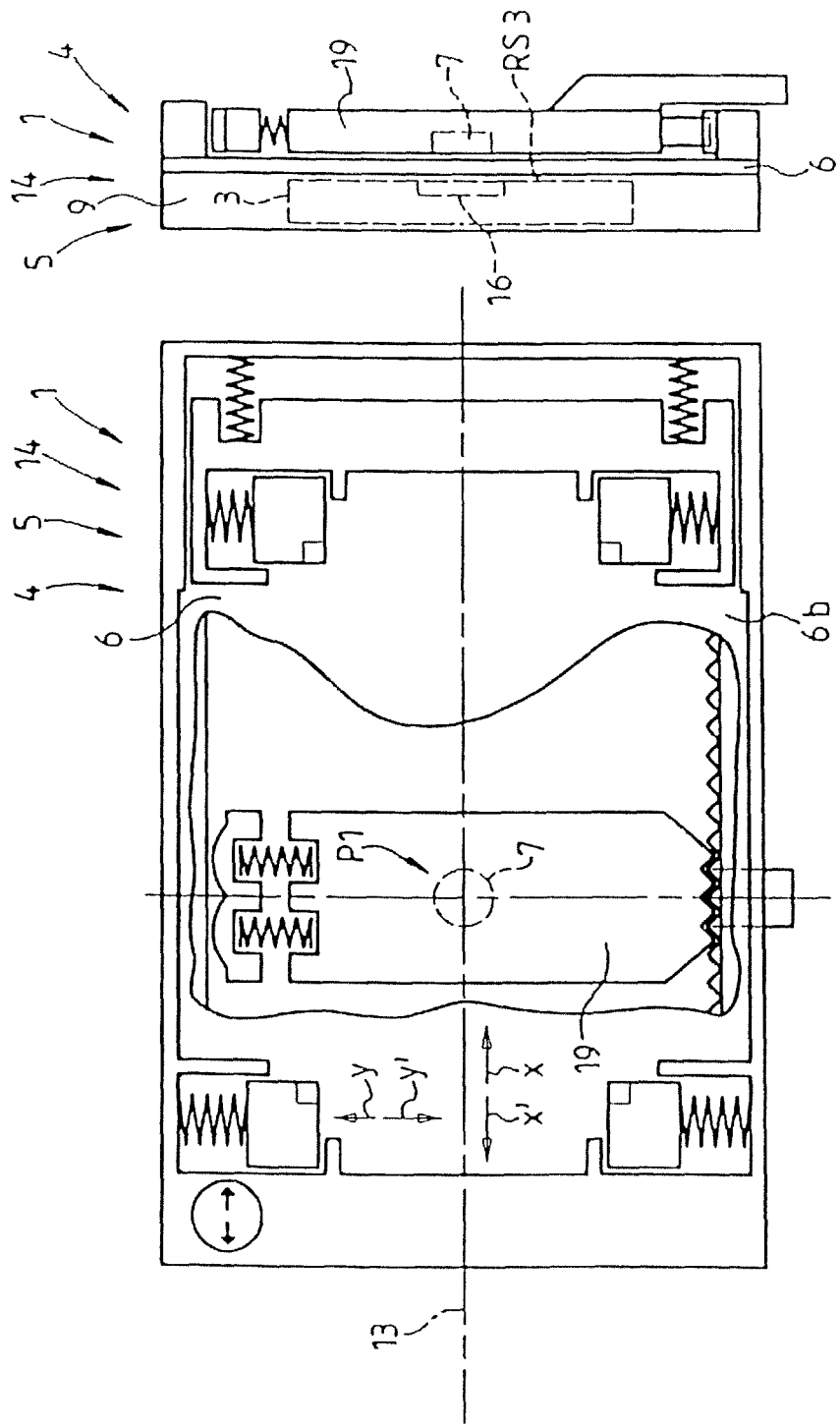

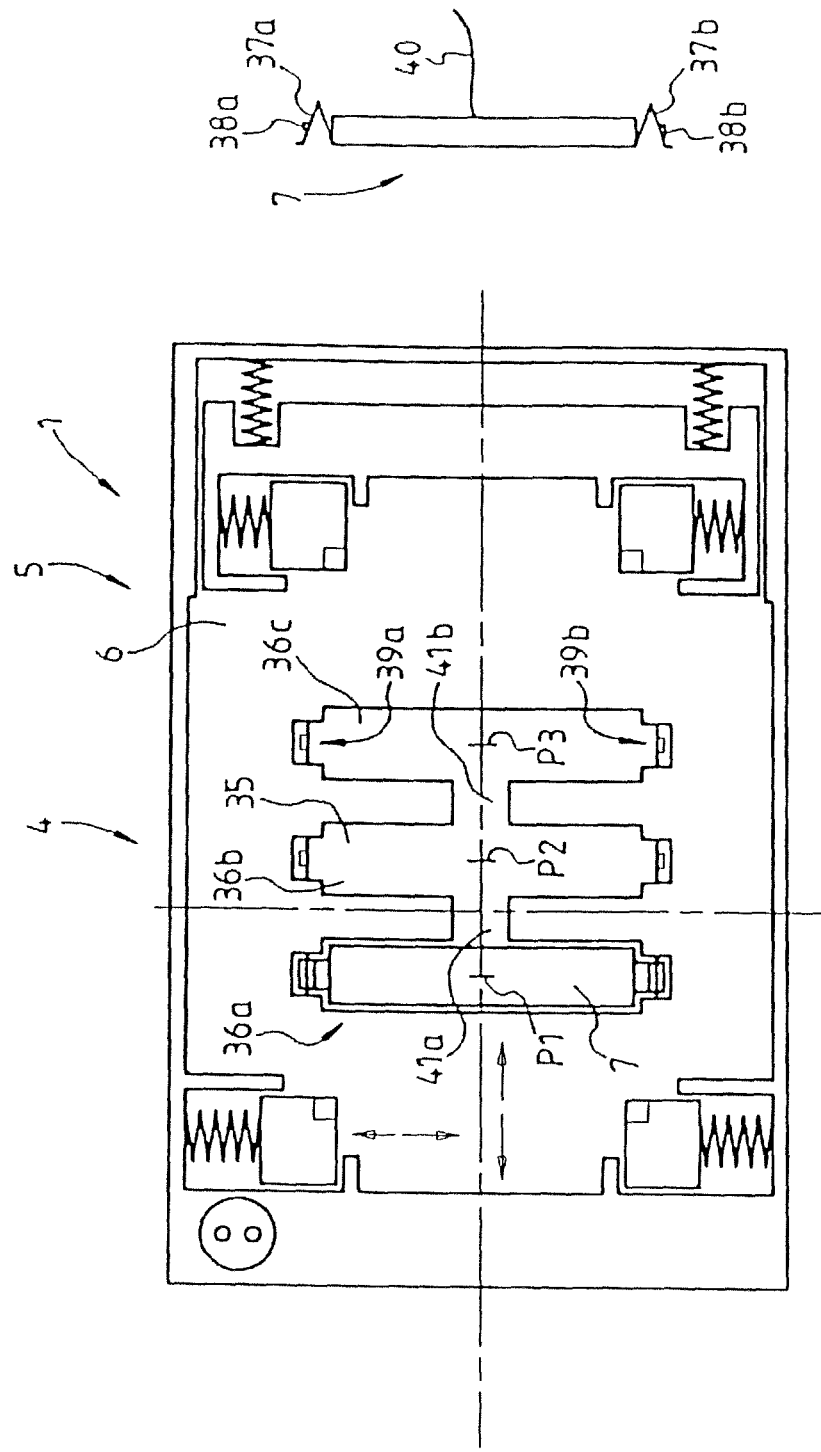

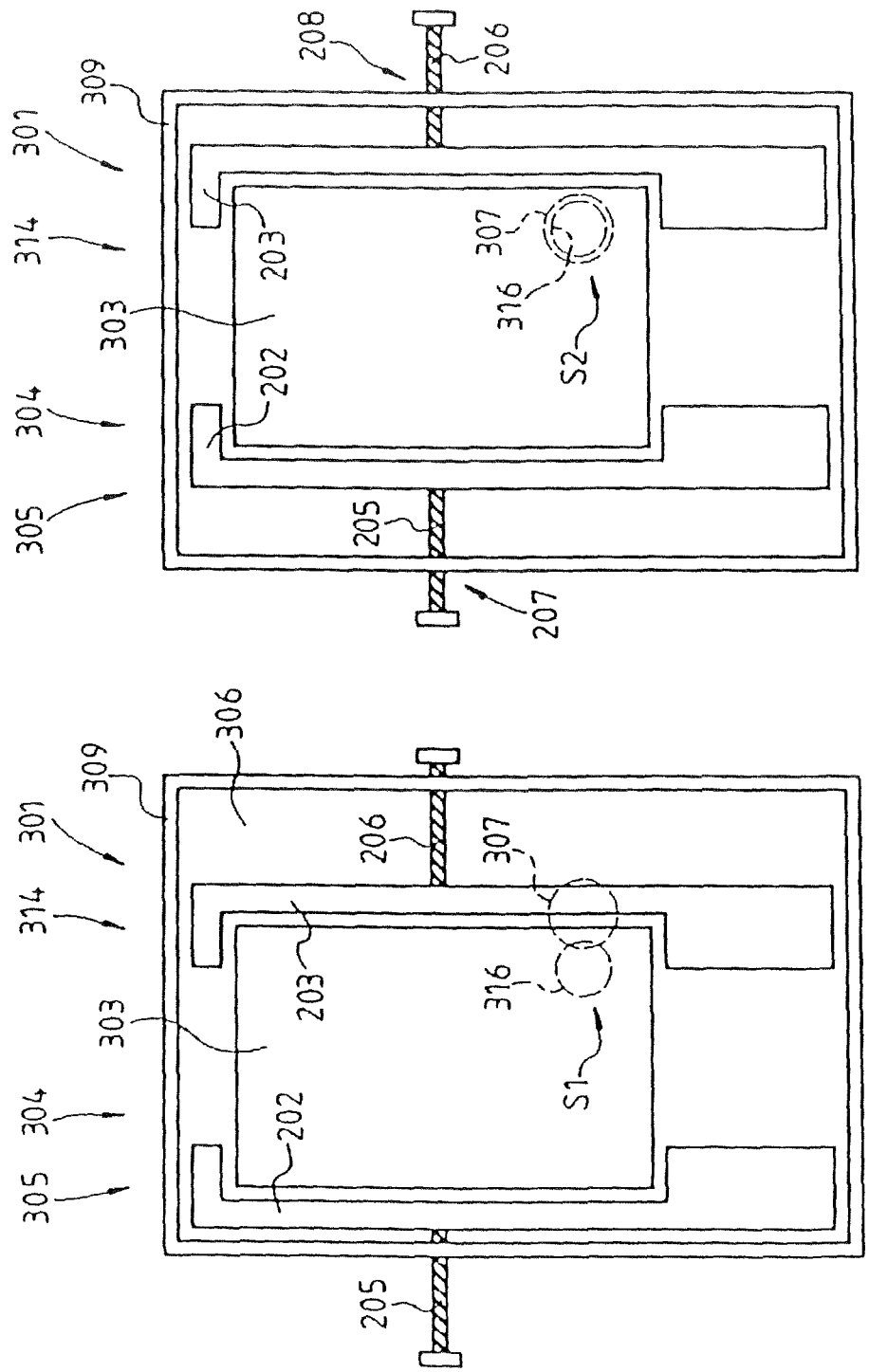

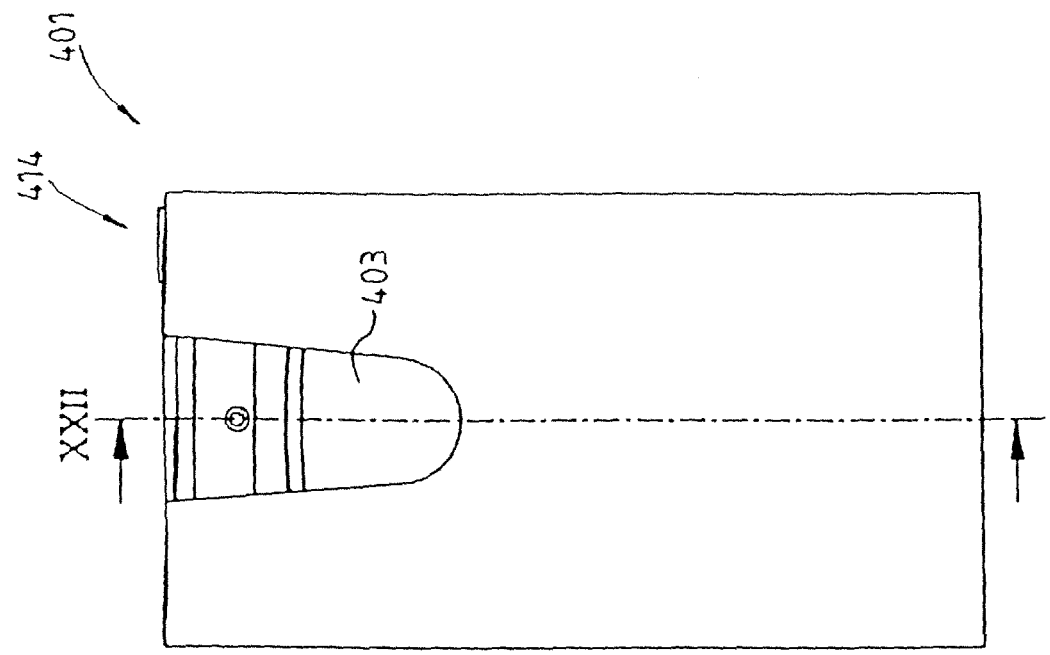
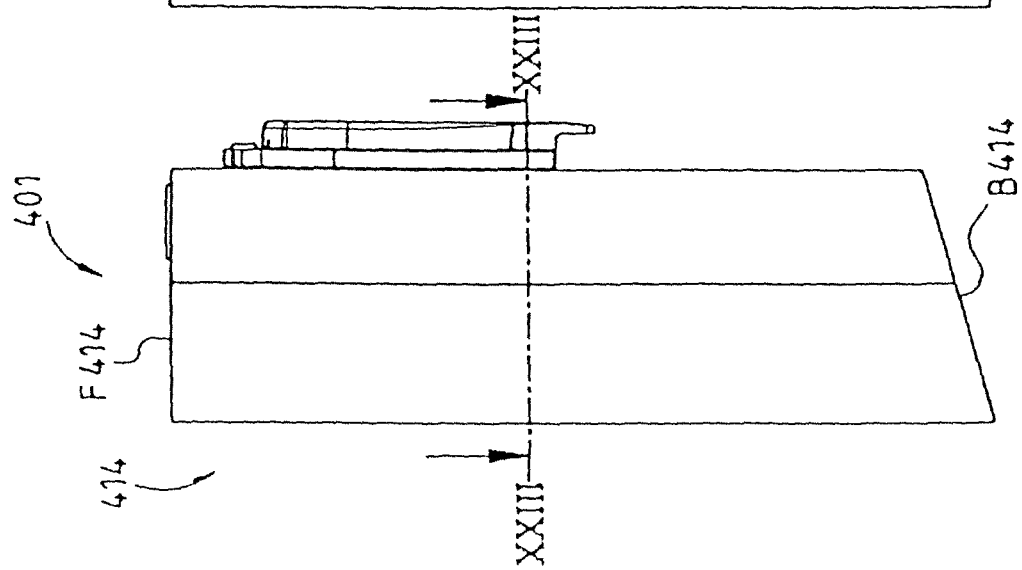

CHARGING ARRANGEMENT FOR A VEHICLE

CROSS-REFERENCE TO RELATED APPLICATIONS

This application claims the benefit under 35 USC §119 (a)-(d) of German Application Nos. 10 2011 104 990.1 and 10 2011 110 680.8 having filing dates of Jun. 8, 2011 and Aug. 19, 2011, respectively, the entireties of which are incorporated herein by reference.

BACKGROUND OF THE INVENTION

1. Field of the Invention

The present invention relates to a charging arrangement for a vehicle comprising an inductively chargeable mobile electronic appliance.

2. Description of Related Art

DE 10 2010 014 654 A1 discloses an inductive charging appliance which, for wire-free charging of different, portable electronic units, comprises a charging surface and a primary coil, with the mobile electronic unit being placed down for charging on the charging surface, and with the primary coil being mounted such that it can be moved in an internal compartment and being positioned and held by magnetic force. A charging appliance such as this cannot guarantee that energy is always transmitted with the same efficiency, because of the shaking, vibrations or centrifugal forces which exist for the mobile electronic unit and the primary coil, in particular in a vehicle.

SUMMARY OF THE INVENTION

The object of the present invention is to propose a charging arrangement which ensures optimum, permanent and operationally reliable energy transmission for one electronic appliance of a multiplicity of electronic appliances, in spite of the shaking, vibrations and centrifugal forces which occur in vehicles.

The charging arrangement according to the present invention for a vehicle comprises an inductively chargeable mobile electronic appliance of a plurality of different, inductively chargeable, mobile electronic appliances having a secondary coil for charging electronics and a rechargeable battery in the mobile electronic appliance and a charging device having a primary coil and a charging surface which is associated with the primary coil and above which the mobile electronic appliance can be positioned for charging. The charging device according to the present invention provides that the primary coil can be fixed in a first primary position and in at least one second primary position relative to the charging surface, with the primary coil being fixed on a primary plane defined by the different primary positions, and with the primary coil being fixed in the chosen primary position independent of shaking or vibrations or centrifugal forces acting on the charging arrangement, and independent of the presence of the mobile electronic appliance. This results in a charging arrangement which ensures a desired alignment of the primary coil with the mobile electronic appliance, even when in traffic, since the primary coil is fixed in its individual position such that it is not displaced out of its respective position by externally acting forces. The essence of the present invention is therefore a charging arrangement which allows the primary coil to be aligned with different electronic appliances, which are suitable for inductive charging, without the use of a variable charging device or the user being subject to a disadvantage in comparison to an inductive charging device which is designed for one specific electronic appliance, since the primary coil of the charging arrangement can be individually adjusted for the respectively used appliance, and is not shifted from its preselected position, even in rough daily use in a vehicle.

Furthermore, the present invention provides for the charging arrangement to be equipped with a holding device which holds the mobile electronic appliance which has been selected for use from a plurality of appliances and is fixed above the charging surface, in particular with the rear face of the mobile electronic appliance resting on the charging surface. Fixing the mobile electronic appliance in this way ensures that its position and the position of the secondary coil, which is arranged in the mobile electronic appliance, are not adversely affected by influences which occur, in particular in a vehicle, such as vibrations, oscillations or centrifugal forces, so that a charging process can be carried out without interruption with a high efficiency which, in particular, is dependent on the mutual alignment of the primary coil and secondary coil.

The present invention also provides that the primary plane, on which the primary coil can be fixed in different positions, can be aligned parallel to an upper face of the charging surface. This ensures that a distance measured at right angles to the charging surface between the primary coil and the secondary coil of a mobile electronic appliance is the same in all areas of the charging surface, when the secondary coil, which is fitted in the mobile electronic appliance, is in each case at the same distance from the charging surface.

One embodiment variant of the charging arrangement provides for the charging arrangement to be equipped with at least one carriage, on which the primary coil is seated, with the primary coil being movable together with the respective carriage from the first primary position to at least one of the further primary positions and, in each case being fixable therein. The charging arrangement for this purpose in particular comprising a toothed rod, with the at least one carriage (e.g., first carriage) being movable linearly along the toothed rod, and being connected in an interlocking manner to the toothed rod in at least two carriage positions. The first carriage of the primary coil having teeth which are matched in particular to the toothed rod, and being pressed against the toothed rod, in particular by a spring element, in which case the first carriage can be decoupled from the toothed rod and can be moved, in particular against a force of the spring element, by operation of a key, which is connected to the carriage, and with the first carriage being supported, in particular by a slider on a strip which is opposite the toothed rod. Depending on a length and a pitch of the toothed rod, this embodiment variant is suitable for being fixed in multiple different relative positions with respect to the charging surface and/or with respect to a secondary coil of a mobile electronic appliance, which interacts with the charging arrangement. In particular, a slide mechanism such as this, which latches with itself, is also highly suitable for being positioned in accordance with a scale. The present invention therefore also provides for the charging arrangement to be equipped with a scale, which is aligned with the key, whose operation decouples the first carriage for movement of the toothed rod. According to the present invention, specific types of mobile electronic appliances are indicated on this scale, in order to allow the user to position the primary coil quickly and easily for a specific mobile electronic appliance.

According to one development of the embodiment variant described above, the present invention provides for the charging arrangement to be equipped with a second carriage, with the second carriage supporting the primary coil and being arranged such that it can be moved on and can be fixed with respect to the first carriage, with the first carriage being movable in a first spatial direction, with the second carriage being movable relative to the first carriage, in particular in a second spatial direction, with the first and the second spatial direction being aligned in particular orthogonally with respect to one another and in particular parallel to the primary plane. The second carriage being movable relative to the first carriage, in particular by means of a drive which is fixed to the first carriage, with the drive in particular being in the form of a self-locking spindle drive, with a spindle of the spindle drive being mounted on the first carriage in particular such that it can rotate and cannot be moved linearly, with the second carriage being connected to the spindle, in particular by means of a threaded bush, with the second carriage being guided on the first carriage, and with the spindle having, in particular, an operating end. The use of two crossed-over carriages makes it possible not only to linearly match the position of the primary coil of the charging device with the mobile electronic appliance to be charged, but also to align the primary coil laterally. This makes it possible to move the primary coil to multiple positions which are distributed on a surface.

An alternative embodiment variant provides for at least one recess to be formed in the charging surface, with the primary coil being fixable in at least two primary positions in this recess, or for at least two recesses to be formed in the charging surface. In this case, the primary coil can be inserted and fixed in one of the primary positions depending on the mobile electronic appliance to be charged. A charging arrangement designed in this way is particularly cost-effective, because there is no need for movable components such as carriages, while providing multiple fixed positions for the primary coil.

According to one embodiment of the present invention, it is provided that, during a charging operation, the efficiency of the energy transmission from the primary coil of the charging device to the secondary coil of the mobile electronic appliance can be signalled at an output device in at least two states, in order to provide the user with information about the quality of the position of the primary coil and/or to signal a recommendation for movement to the user. According to the present invention, visual and/or audible signals may be used. This enables the user to move the primary coil to a secondary position, in order to achieve optimum efficiency, with minimal effort. Optimum efficiency is important in order to allow a mobile electronic appliance whose state of charge is low to be sufficiently recharged for further use even when driving a motor vehicle for a short distance.

Furthermore, another embodiment of the present invention provides manual positioning of the primary coil and/or of the carriage or carriages or adjustment of the primary coil and/or of the carriage or carriages by means of a motor or motors, in particular an electric motor or motors. In the case of motor positioning, it is possible to automate the process of optimum alignment between the primary coil and the secondary coil with the aid of open-loop and/or closed-loop control electronics. This is particularly advantageous when the charging arrangement is often used with different electronic appliances.

According to one embodiment of the present invention, an output device can be integrated in the mobile electronic appliance and/or in the charging device for control, monitoring or carrying out alignment of the primary and secondary coils. Integration in the charging device allows the output device to be made available for any mobile electronic appliance which is being charged. Integration in the mobile electronic appliance, which is done in particular by software according to the present invention, allows the charging device to be produced in a manner which saves resources, while providing a convenient function.

In particular, the present invention provides for the output device to signal the direction in which the primary coil should be moved in order to improve the efficiency of the inductive transmission of electrical energy. According to the present invention, this is best done by two or four direction indications, depending on the number of movement axes.

In another embodiment, the charging arrangement further comprises an inductively chargeable mobile electronic appliance having a secondary coil, charging electronics and a rechargeable battery, and a charging device having a primary coil and a charging surface which is associated with the primary coil, with the secondary coil being arranged in a fixed position in the mobile electronic appliance. Furthermore, the charging arrangement comprises a holding device in which the mobile electronic appliance is held, and with the mobile electronic appliance being fixable in the holding device relative to the charging surface of the charging device selectively in a first shaking-resistant secondary position and at least one second shaking-resistant secondary position, or with the mobile electronic appliance being fixable together with the holding device relative to the charging surface of the charging device selectively in a first shaking-resistant secondary position and in at least one second shaking-resistant secondary position. Such fixing of the secondary coil and of the mobile electronic appliance in different secondary positions allows the efficiency of the energy transmission for different mobile electronic appliances to be optimized even when the primary coil is stationary.

According to another embodiment of the present invention, the mobile electronic appliance can be moved in the holding device in at least one spatial direction from the first secondary position to the further secondary positions, or the mobile electronic appliance can be moved together with the holding device in at least one spatial direction from the first secondary position to the further secondary positions. This makes it possible to change position without the mobile electronic appliance and the holding device or the holding device and the charging surface having to be separated.

According to another embodiment of the present invention, the mobile electronic appliance can be moved manually, or the mobile electronic appliance can be moved by a motor or motors and in particular by an electric motor or motors, or the holding device can be moved manually with the mobile electronic appliance, or the holding device can be moved with the mobile electronic appliance by a motor or motors, and in particular by an electric motor or motors. In particular, motor movement makes it possible to automate the process of moving the secondary coil closer to the primary coil.

Furthermore, an output device, which indicates by means of a signal the secondary position to which the secondary coil should be moved in order to improve the efficiency of inductive transmission of electrical energy, easily makes it possible for the user to optimize the arrangement.

Finally, the present invention provides for the charging arrangement to be associated with a holding device, with the holding device being movable by an electric motor or motors, in particular by means of a spindle drive, to a release position for removal of the electronic appliance and at least one charging position for charging of the electronic appliance, with the charging device being movable with the primary coil, in particular by means of a spindle drive, and in particular orthogonally with respect to the holding device. In a charging arrangement such as this, an electric-motor movement of the holding device results, in addition to additional convenience, in additional flexibility of the charging arrangement as well, by the electronic appliance being moved in and out automatically, since the spindle drive for the holding device can be used in addition to an electric-motor drive, which is provided in particular, for alignment of the primary coil, for optimum alignment of the electronic appliance with the primary coil.

BRIEF DESCRIPTION OF THE DRAWINGS

Further details of the present invention will be described with reference to exemplary embodiments which are illustrated schematically in the drawings.

FIG. 1 shows a plan view of a holding device which is arranged on a charging surface, with the charging surface being illustrated partially cut away;

FIG. 2 shows a side view from FIG. 1, from an arrow direction II;

FIGS. 5 and 6 show illustrations corresponding to FIGS. 1 and 2, with the first carriage being unlocked;

FIGS. 11 and 12 show a plan view and a side view of a holding device which is arranged on a charging surface, with the charging surface being illustrated partially cut away, of an embodiment variant of the first carriage;

FIG. 13 shows a plan view of a holding device which is arranged on a charging surface, with the charging surface having a plurality of recesses for holding a primary coil;

FIG. 14 shows a side view of the primary coil illustrated in FIG. 13;

FIGS. 17 and 18 show a charging arrangement with a mobile electronic appliance which is fixed movably in the holding device;

FIG. 20 shows a view of the charging arrangement as shown in FIG. 19, from an arrow direction XX;

FIG. 21 shows a view of the charging arrangement as shown in FIG. 19, from an arrow direction XXI;

DETAILED DESCRIPTION OF THE INVENTION

Figure 3:
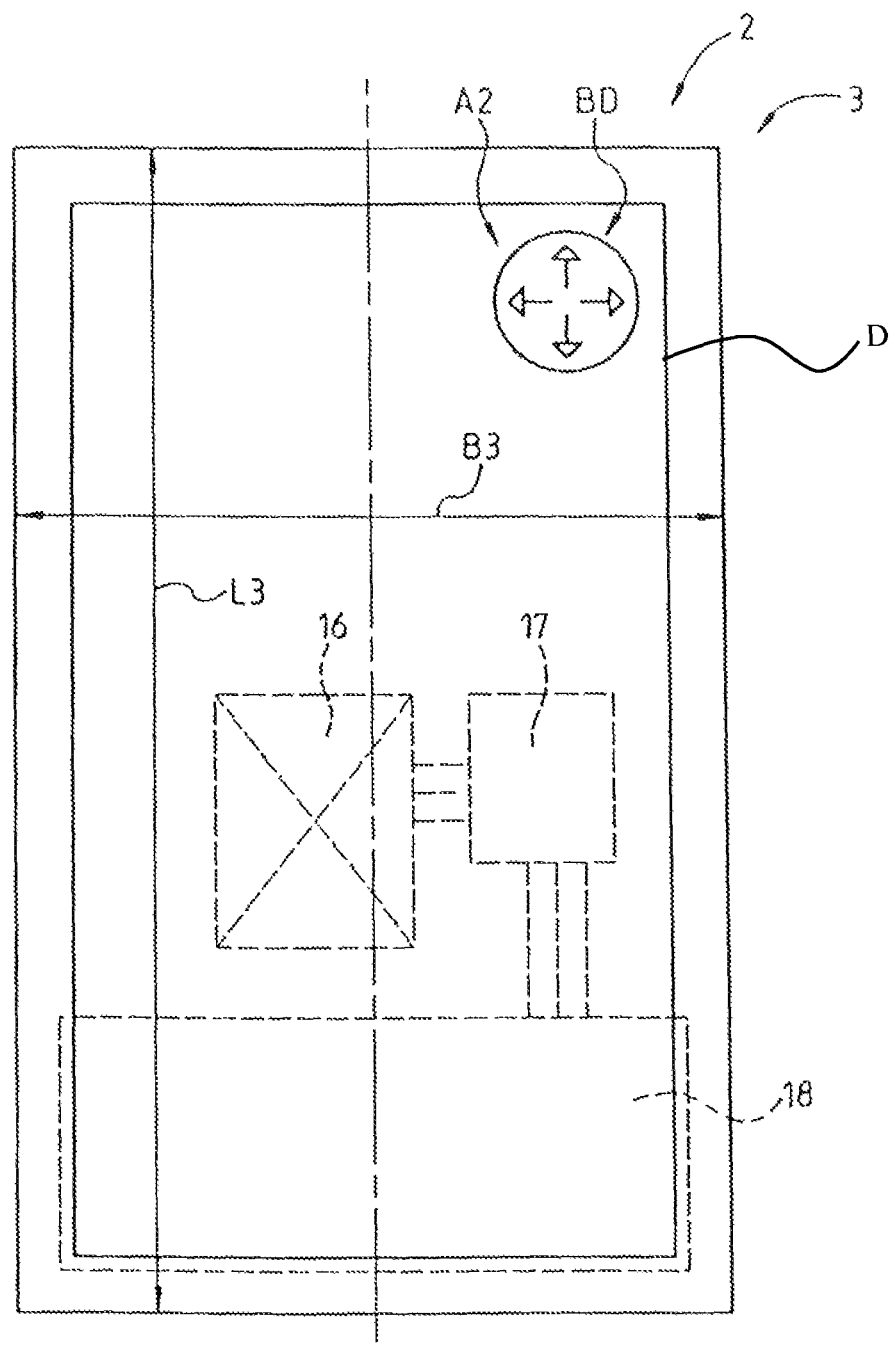
FIG. 3 shows a plan view of a mobile electronic appliance which is in the form of a mobile telephone.

FIG. 1 shows a plan view of a charging arrangement 1 without a mobile electronic appliance. FIG. 3 shows a plan view of a mobile electronic appliance 2 which is intended to be inserted into the charging arrangement 1, with the mobile electronic appliance 2 being in the form of a mobile telephone 3. The charging arrangement 1 shown in FIG. 1 comprises a charging device 4 and a holding device 5. Essentially, of the charging device 4, a charging surface 6 and a primary coil 7 in the area of the charging surface 6 which is illustrated cut away are disclosed. The holding device 4 which holds the mobile telephone 3 illustrated in FIG. 3 comprises four holding jaws 8a to 8d, which are mounted in a sprung manner. In this case, the holding jaws 8a and 8b are supported with respect to a frame 9 of the holding device 5, and the holding jaws 8c and 8d are supported on a link 10 which is supported on the frame 9 in the arrow direction x by spring elements 11a, 11b. The holding jaws 8a to 8d are sprung via spring elements 12a to 12d in the arrow direction y or y'. A mobile telephone which has been inserted into a device 14 which comprises the charging device 4 and the holding device 5 is correspondingly centered on a longitudinal axis 13 of the device 14. The sprung bearing of the holding jaws 8a to 8d and of the link 10 means that the device 14 is suitable for holding mobile telephones of different width and different length. The mobile telephone 3 shown in FIG. 3 has, for example, a width B3 and a length L3. The primary coil 7, which is located under the charging surface 6, is used for transmission of electrical energy from a vehicle 15, in which the device 14 is integrated, to the mobile telephone 3 shown in FIG. 3, when the latter is held in the holding device 5. For this purpose, the mobile telephone 3 has a secondary coil 16 for charging electronics 17 and a rechargeable battery 18. In order to transmit energy with as little loss as possible from the primary coil 7, which is fed from the vehicle 15, to the secondary coil 16 independent of which mobile telephone from the plurality of inductively chargeable mobile telephones has been inserted into the device 14, the primary coil 7 is arranged on a first carriage 19. The first carriage 19 is opposite a lower face 6a of the charging surface 6 (see FIG. 2), and is guided between a toothed rod 21 and a strip 22. The first carriage 19 comprises a base body 23 with an integrally formed key 24 of first carriage 19 and a toothed strip 25, as well as a slider 26, which is borne via spring elements 27a, 27b on the base body 23. In a fixed position, as is shown in FIGS. 1 and 2, the toothed strip 25 of the first carriage 19 engages in the toothed rod 21 and is supported by its slider 26 on the strip 22 with the pressure force produced by the spring elements 27a, 27b, with the strip 22 being opposite the toothed rod 21. The base body 23 of the first carriage 19 has an aperture 28, in which a second carriage 29 is guided, in which the primary coil 7 is located. As can be seen from FIG. 2, which shows a side view in the arrow direction II of the illustration in FIG. 1, the second carriage 29 is guided on a spindle 30, which is borne such that it can rotate on the base body 23 of the first carriage 19, and is guided on the second carriage 29 by a spindle nut 31, which is firmly connected to the second carriage 29. Rotation of the spindle 30 about a rotation axis 32 therefore leads to a linear movement of the second carriage 29 in the arrow direction y or y'. In this case, the spindle 30 is operated by means of a knurled nut 33, which forms an operating end. The spindle 30 and the spindle nut 31 form a spindle drive 34 which is self-locking and therefore positions and fixes the second carriage 29, and therefore also the primary coil 7, in the illustrated first primary position P1, such that the first primary position P1 is not changed by shaking, vibrations or other disturbing influences. Corresponding security is also offered by the fixing of the first carriage 19 on the device 14. The primary coil 7 can be moved on a primary plane PE (see FIG. 2) by means of the carriages 19 and 29, with the primary plane PE being aligned parallel to a by an upper face 6b of the charging surface 6.

Figure 4:
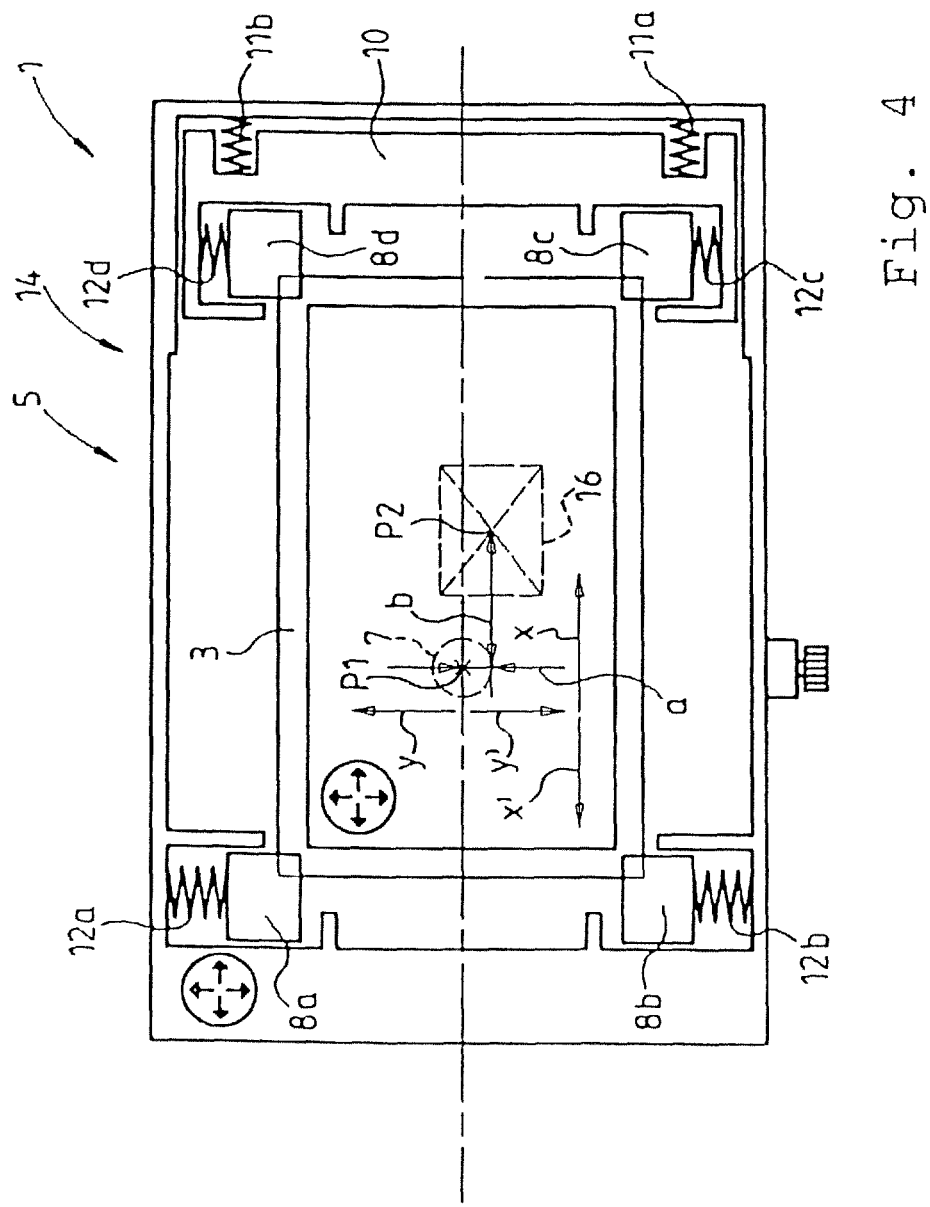
FIG. 4 shows a plan view of the holding device shown in FIG. 1 with a mobile telephone inserted.

FIG. 4 shows a plan view of the device 14 as known from FIG. 1 of the charging arrangement 1, the mobile telephone 3 shown in FIG. 3 now having been inserted into the holding device 5. The spring elements 12a to 12d of the holding jaws 8a to 8d and the spring elements 11a, 11b of the link 10 are now compressed corresponding to the length and width dimensions of the mobile telephone 3. The primary coil 7 and the secondary coil 16 are shown by dashed lines, and it can be seen that the coils 7, 16 have not yet been optimally aligned. For optimum energy transmission, it is necessary for the primary coil 7 to be moved from its first primary position P1 to a second primary position P2 through a movement distance a in the arrow direction y' and through a movement distance b in the arrow direction x.

For this purpose, the first carriage 19 is first of all unlocked, as is shown in FIGS. 5 and 6. This is done by pushing the key 24 of first carriage 19, which is connected to the base body 23, in the arrow direction y. This compresses the spring elements 27a and 27b, and the toothed strip 25 is disengaged from the toothed rod 21 by the movement of the base body 23 in the arrow direction y. In the unlocked position of the first carriage 19, as shown in FIGS. 5 and 6, this carriage 19 can now be moved under the charging surface 6 between the strip 22 and the toothed rod 21 without any impediment in the arrow direction x or the arrow direction x'. For clarity reasons, FIG. 5 shows only the secondary coil 16 of the mobile telephone.

Figures 7, 8:
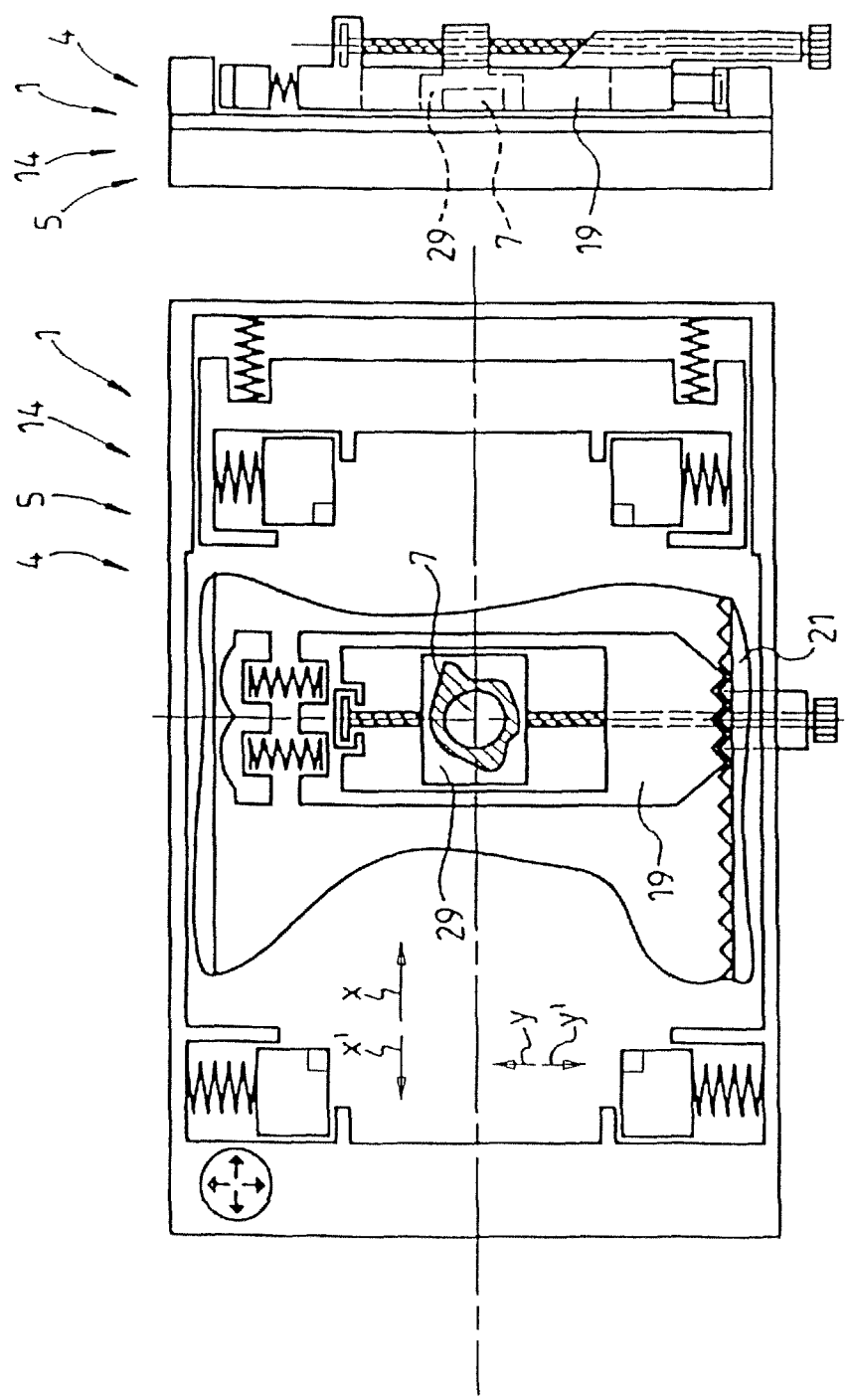
FIGS. 7 and 8 show illustrations corresponding to FIGS. 1 and 2, with the first carriage being fixed in a new position.
Figures 9, 10:
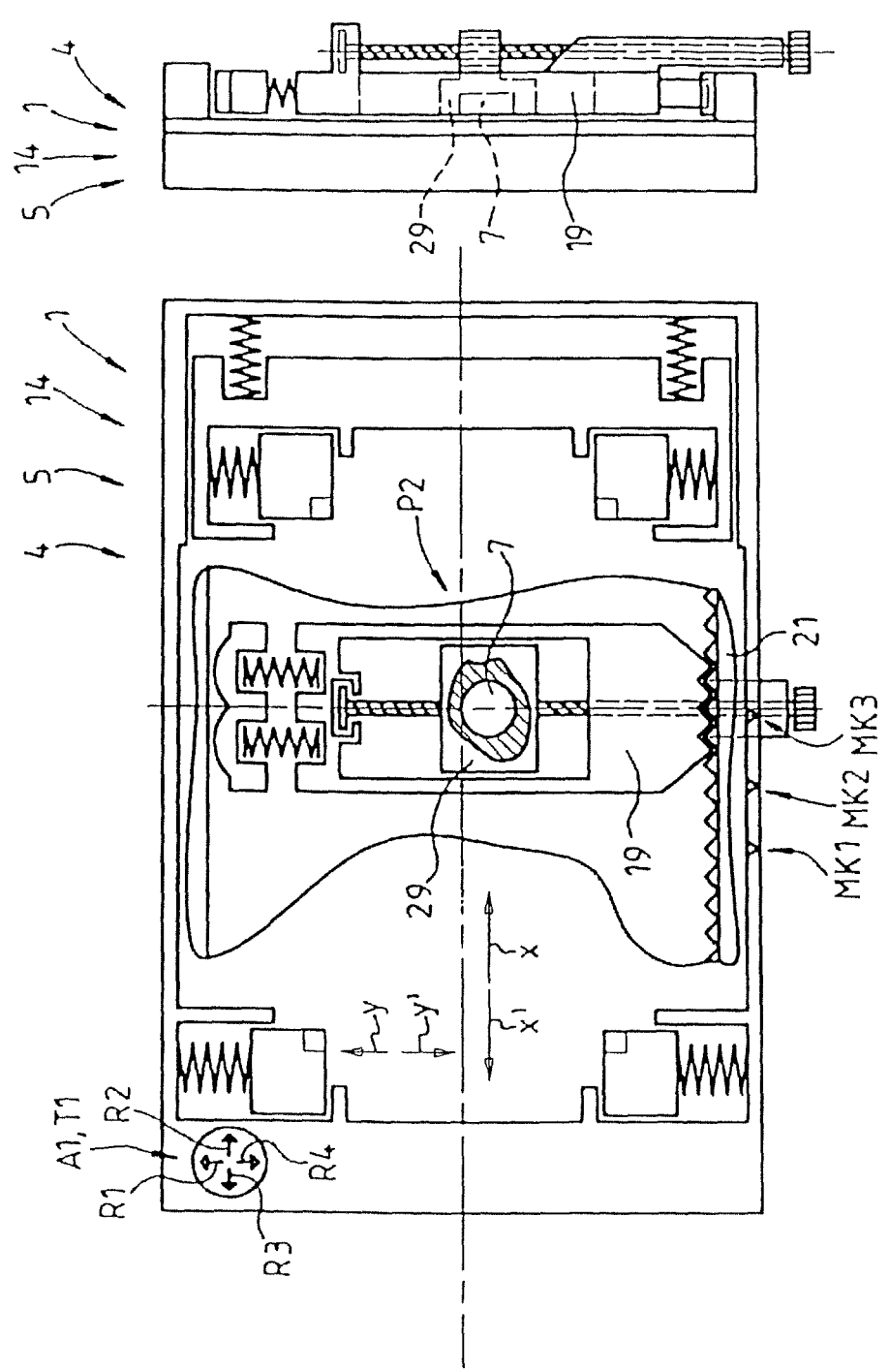
FIGS. 9 and 10 show illustrations corresponding to FIGS. 7 and 8, with the second carriage being fixed in a new position.

FIGS. 7 and 8 now once again show the charging arrangement 1 without the mobile telephone 3, with the first carriage 19 now having been moved through the distance b, as shown in FIG. 4, in the arrow direction x, and now having been latched again with the toothed rod 21. Once again analogously to FIG. 2, FIG. 8 shows a side view of FIG. 7. In comparison to FIGS. 7 and 8, FIGS. 9 and 10, respectively, show how the second carriage 29 is moved together with the primary coil 7 in the arrow direction y' through the movement distance a shown in FIG. 4, such that the primary coil 7 is now fixed in the desired second primary position P2 in FIGS. 9 and 10. The charging device 4 also comprises an output device A1 by which, during a charging operation, the efficiency of the energy transmission from the primary coil 7 of the charging device 4 to the secondary coil 16 of the mobile telephone 3 (see FIG. 4) can be signalled in two states, in order to signal assessment of the position of the primary coil 7 and in order to signal a recommendation for movement. For this purpose, the output device A1 comprises four direction arrows R1 to R4, with the lighting of one or two arrows indicating that the primary coil 7 should be moved appropriately using the carriages 19 and/or 29, in order to achieve an optimum alignment of the primary coil 7 with the secondary coil 16, and with non-illumination of the output device A1 meaning that the coils 7, 16 have been aligned optimally with respect to one another. The output device A1 is, in particular, also in the form of an electrical push button T1, so that the work of the output device is started and ended by slight pressure on the output device.

FIG. 3 shows one embodiment variant of the output device as described above. The output device A2 illustrated there is not a component of the charging device 4 or of the holding device 5, but is in the form of software in the mobile telephone 3, and can be started as a program on the mobile telephone 3, with the program then resulting in a figure display BD, which is matched to the output device as described above by way of example, being displayed on a display D.

Analogously to FIGS. 1, 2 and 4 to 10, FIGS. 11 and 12 show a charging arrangement 1 in which the device 14, which comprises a charging device 4 and a holding device 5. The charging device 4 comprises a first carriage 19, which holds a primary coil 7 directly and without the interposition of a second carriage. This device 14 makes it possible to move the primary coil 7 along a longitudinal axis 13 in the x and x' directions from a first, illustrated primary position P1 to further primary positions. Dashed lines in FIG. 12 indicate a mobile telephone 3 which is concealed by a surrounding frame 9. Facing a rear face RS3, the mobile telephone 3 has a secondary coil 16, which is aligned with the longitudinal axis 13 in the same way as the primary coil 7. The rear face RS3 of the mobile telephone 3 is opposite an upper face 6b of a charging surface 6. The primary coil 7 is moved in the x or x' direction, in order to optimize the energy transmission, depending on how the secondary coil in the case of the mobile telephone or mobile electronic appliance which is in each case used in the device 14, and depending on the position of the secondary coil in the respective mobile telephone. The device 14 forms a holding and charging device for different mobile electronic appliances.

FIG. 13 illustrates a further charging arrangement 1 without a mobile telephone, having a holding device 5 which is designed analogously to the holding devices as described above. A charging device 4 does not use carriages and essentially comprises a recess 35 which is formed in a charging surface 6. The recess 35 has three holding sockets 36a to 36c, into which a primary coil 7 can be latched in a first primary position P1, a second primary position P1 and a third primary position P3. FIG. 14 illustrates a side view of the primary coil 7. On opposite sides, the primary coil 7 comprises two latching springs 37a, 37b with latching tabs 38a, 38b which engage in undercuts 39a, 39b in the respective holding socket 36a, 36b or 36c when the primary coil 7 is inserted. For clarity reasons, only the undercuts in the holding socket 36c are shown. Energy is supplied to the primary coil 7 via a cable 40, which is illustrated only in FIG. 14. When the primary coil 7 is placed in a different holding socket, the primary coil 7 is removed upwards out of the holding socket 36a, while operating the latching springs 37a, 37b, and is inserted into the desired holding socket 36b or 36c. In the process, the cable 40 of the primary coil 7 passes through a respective channel 41a or 41b, which connects the respective holding sockets 36a and 36b, as well as 36b and 36c.

Figure 16:
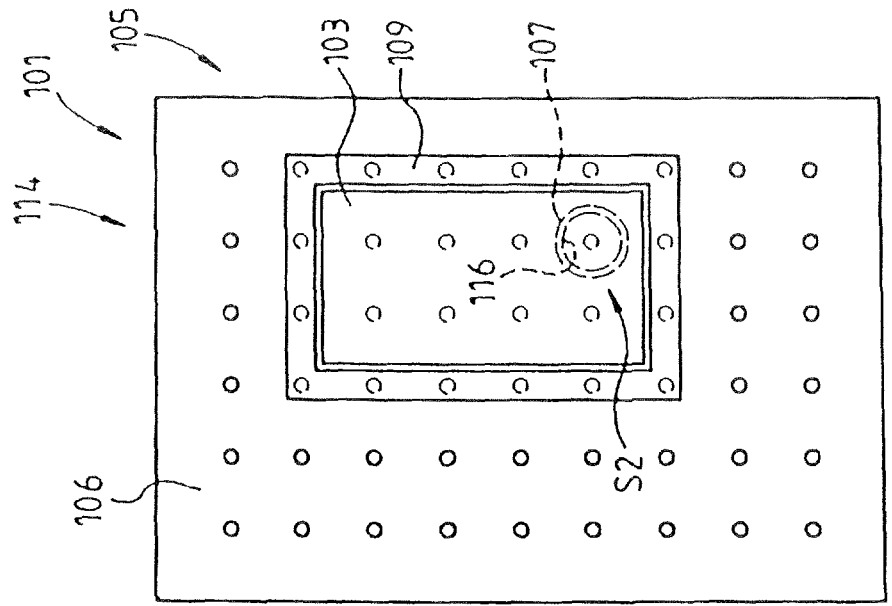
FIGS. 15 and 16 show a charging arrangement with a movable holding device in two positions.
Figure 15:
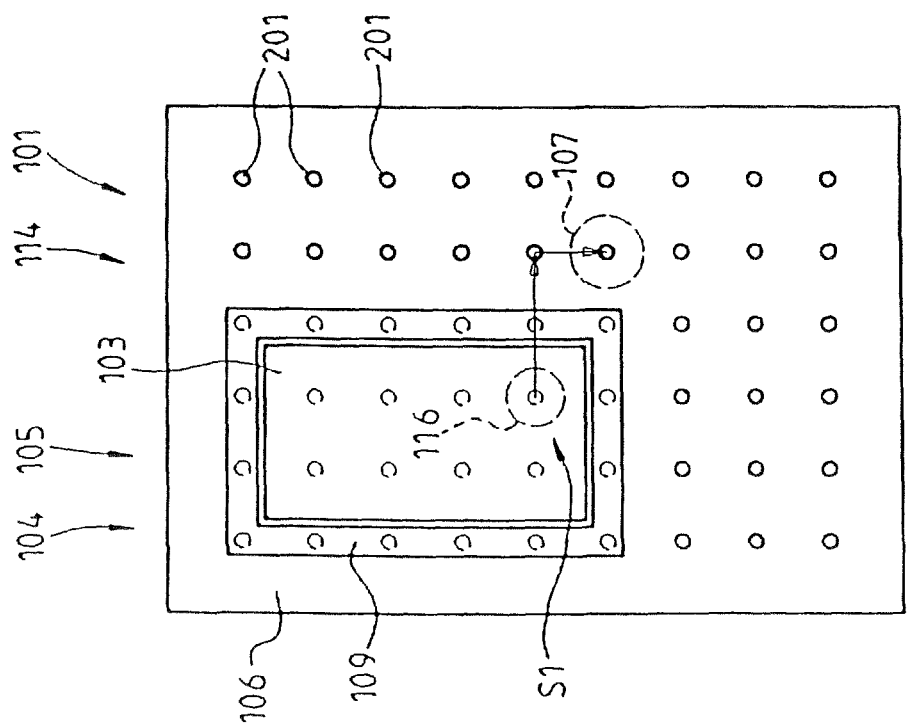

FIG. 15 shows a charging device 101 which, in addition to a mobile telephone 103, comprises a device 114 which is composed of a charging device 104 and a holding device 105. The charging device 104 comprises a charging surface 106 and a primary coil 107, which is permanently associated with the charging surface 106. The mobile telephone 103 comprises a secondary coil 116, which is arranged such that it cannot move in the mobile telephone 103. The holding device 105 comprises a frame 109, which has pin-like projections which can be inserted into holes 201 which are formed in the charging surface 106. As is evident from FIGS. 15 and 16 when viewed together, the secondary coil 116 of the mobile telephone 103 is aligned with the primary coil 107 by moving the holding device 105 on the charging surface 106. The secondary coil 116 is correspondingly moved from a first secondary position S1 to a second secondary position S2. The secondary coil 116 and the primary coil 107 are fixed securely with respect to one another by the interlocking connection between the frame 109 and the charging surface 106.

FIG. 17 shows a schematic plan view of a further charging arrangement 301. In addition to a mobile telephone 303, the charging arrangement 301 comprises a device 314 which is composed of a charging device 304 and a holding device 305. A primary coil 307 is arranged in a charging surface 306 of the charging device 304. The mobile telephone 303, which comprises a secondary coil 316, is fixed between two jaws 202, 203 in the holding device 304, which is positioned above the charging surface 306, such that the secondary coil 316 is located in a first secondary position S1. The respective jaws 202 and 203 are borne such that they can each be moved by a respective spindle 205 or 206 on a frame 309 of the holding device 305. A comparable consideration of the FIGS. 17 and 18 shows how the mobile telephone 303 and its secondary coil 316 can be moved from the secondary position S1 as shown in FIG. 17 to a secondary position S2 as shown in FIG. 18 by a parallel movement of the jaws 202, 203 by means of the spindles 205, 206, with the mobile telephone 303, together with its secondary coil 316, being aligned optimally to the primary coil 307 in the secondary position S2. Because of a self-locking embodiment of spindle drives 207, 208 which are formed by the respective spindles 205 and 206 and the frame 309, the mobile telephone 303 and the secondary coil 316 are fixed to the device 314 such that the secondary coil 316 is positioned securely with respect to the primary coil 307 even when subjected to oscillations, vibrations or centrifugal forces which occur in a vehicle.

In the embodiment variants described in FIGS. 15, 16 and 17, 18, provision is likewise made for an output device to produce a signal indicating the secondary position to which the secondary coil should be moved in order to improve the efficiency of the inductive transmission of electrical energy. Alternatively, the output device is provided in the mobile telephone that is used, or in the respective device. In particular, provision is also made for the alignment of the coils to be assisted by audible signals, or for specific spoken instructions to be passed to the user.

According to the present invention, a scale consisting of markings MK1, MK2 and MK3 (see FIG. 9) can also be provided on the device, with the markings being associated with specific mobile telephone types.

Figure 19:
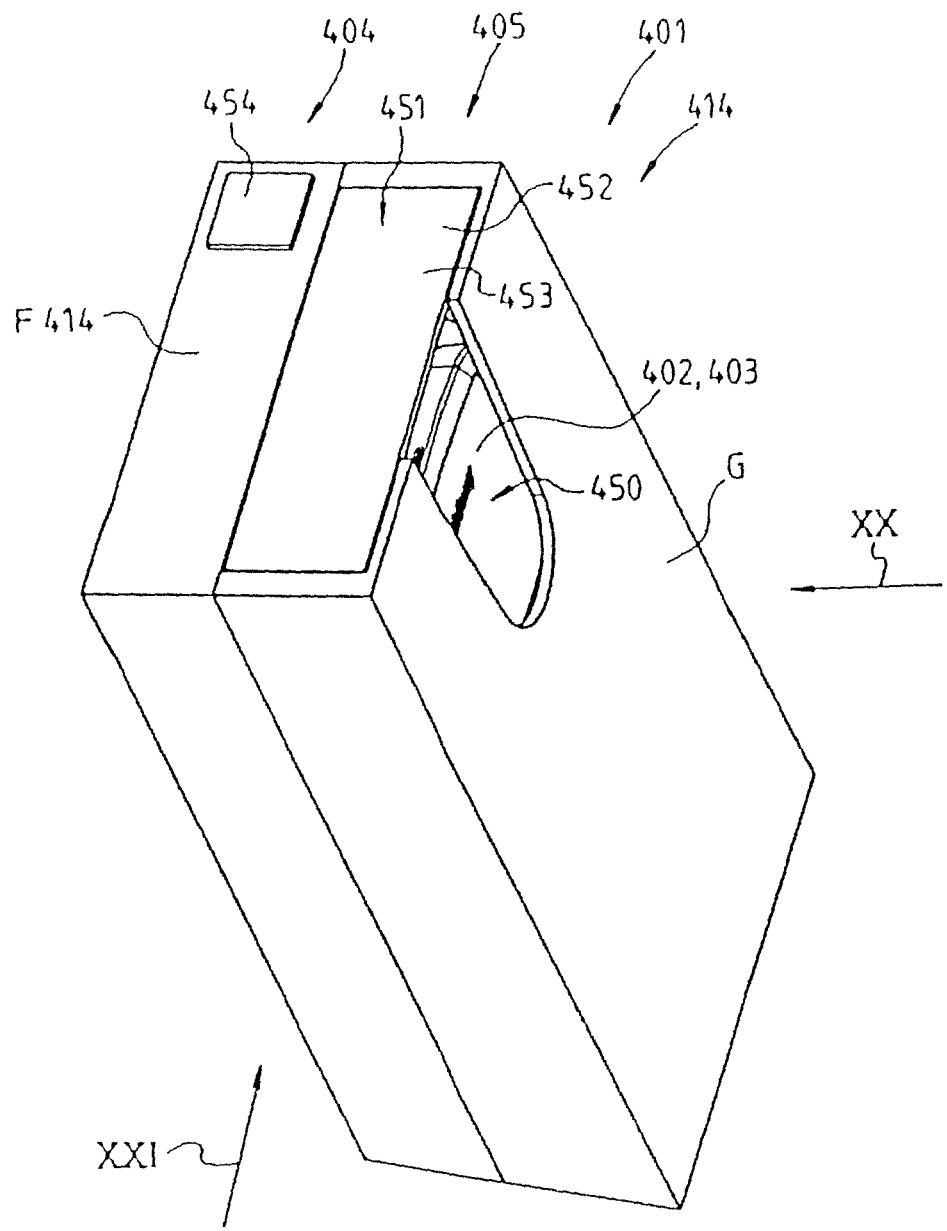
FIG. 19 shows a perspective view of a further embodiment variant of a charging arrangement.

FIG. 19 shows a perspective view of a further embodiment variant of a charging arrangement 401. The charging arrangement 401 comprises an inductively chargeable mobile electronic appliance 402, which is in the form of a mobile telephone 403, a charging device 404 and a holding device 405. A device 414 which can be handled as a component comprises not only a housing G but also the charging device 404 and the holding device 405. This device 414 is intended for installation in a center console, which is not illustrated, of a vehicle, it being installed such that a front face F414 of the device 414 is integrated approximately flush in a surface of the center console. In the illustration shown in FIG. 19, the mobile telephone 403 is held by the holding device 405, with the mobile telephone 403 being supplied to and removed from a holding area 450, the majority of which is filled by the mobile telephone 403, through a slot 451, which can be closed by a flap 452, with the flap 452 being in a closed position 453. An electrical push button 454 is also arranged on the front face F414 of the device 414, by means of which push button automated insertion and withdrawal of the mobile telephone 403, into and out of the holding area 450, can be initiated.

Figure 22:
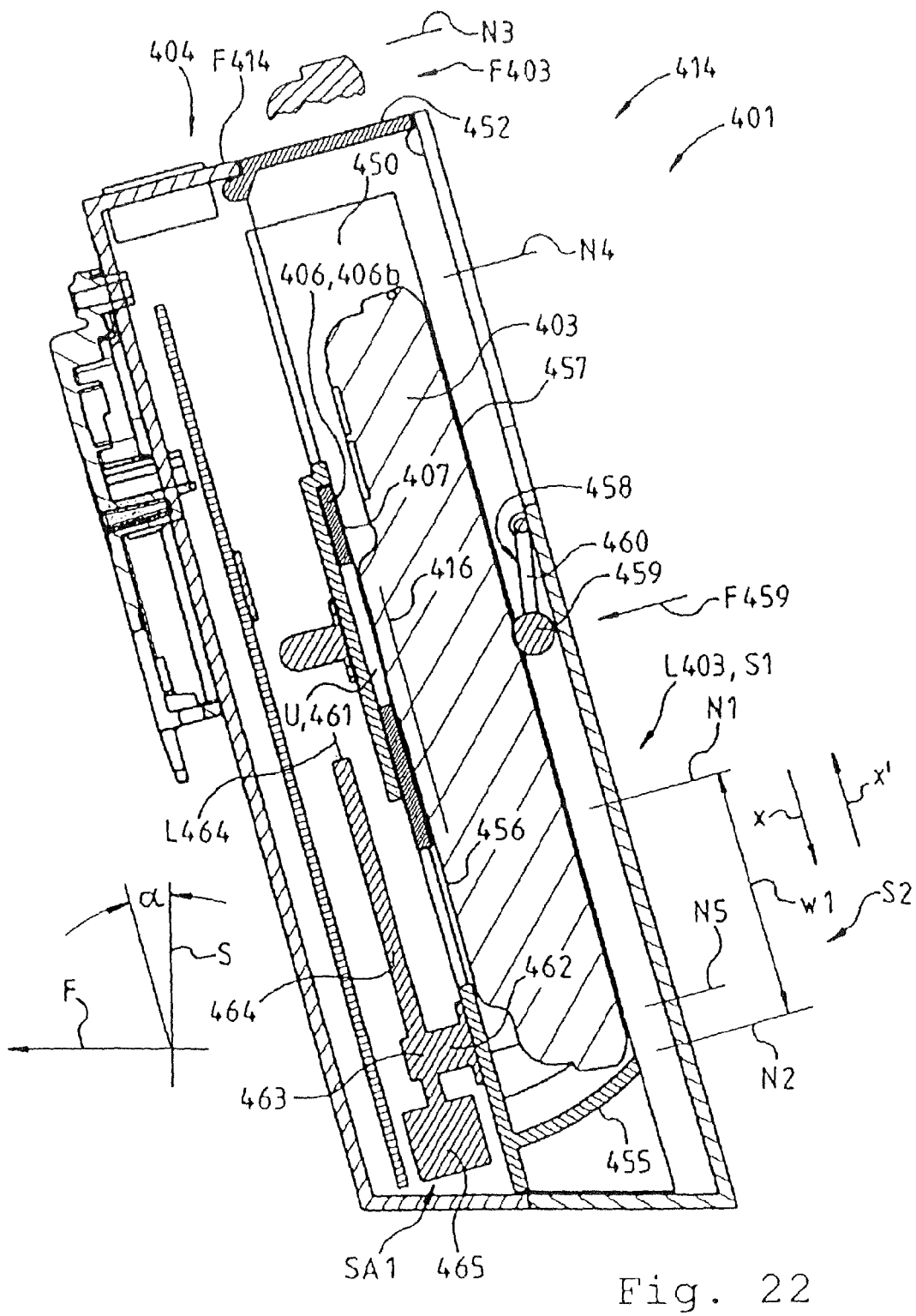
FIG. 22 shows a section view of the charging arrangement as shown in FIG. 19, corresponding to the section line XXII-XXII as shown in FIG. 20.

FIG. 20 shows the charging arrangement 401 known from FIG. 19, or the known device 414 with the mobile telephone 403 held in it, in a view in the arrow direction XX (see FIG. 19), in order to show the profile of a section XXII-XXII as illustrated in FIG. 22.

Figure 23:
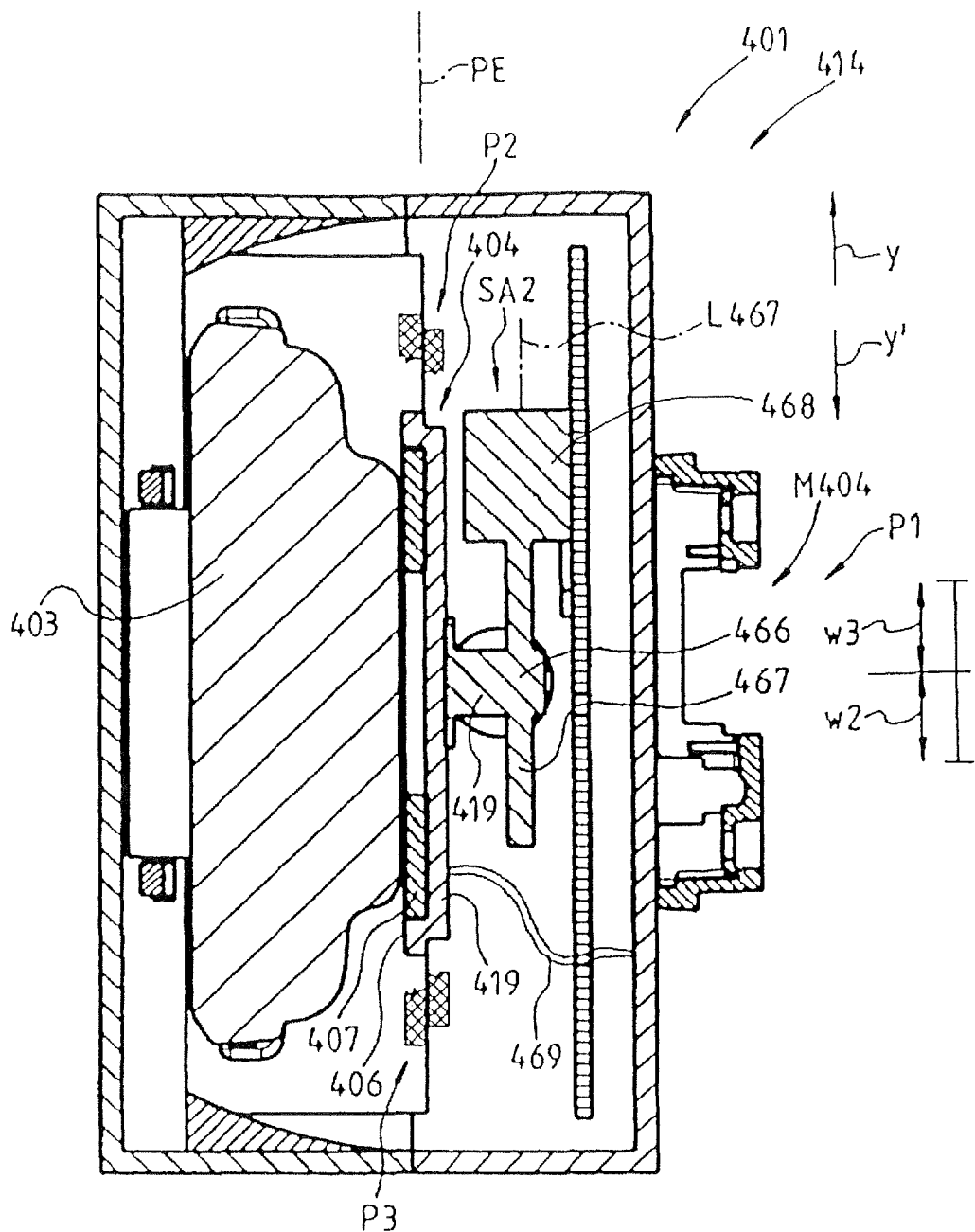
FIG. 23 shows a section view of the charging arrangement as shown in FIG. 19, corresponding to the section line XXIII-XXIII as shown in FIG. 21.

FIG. 21 shows the charging arrangement 401 known from FIG. 19, or the known device 414, in a view in the arrow direction XXI (see FIG. 19), in order to show the profile of a section XXIII-XXIII as illustrated in FIG. 23. FIG. 21 shows well that the device 414 does not form a cuboid, but is designed to be inclined on a bottom face B414 which is opposite the front face F414.

FIG. 22 shows the section, as already described above, through the charging arrangement 401 as well as its device 414 and its mobile telephone 403. The mobile telephone 403 is located in a charging position L403 in which it rests on an upper face 406b of a charging surface 406 of the charging device 404. In order to reach the charging position L403, the mobile telephone 403 together with the holding device 405, which comprises a bag 455, is moved from a release position F403, which is only indicated in the drawing, to the charging position L403, which is completely illustrated. The release position is represented by a partial view of the mobile telephone 403 shown above the front face F414, with the mobile telephone 403 being located at a level N3 in the release position F403 and being inserted into the holding area 450 through a movement distance w1 in an arrow direction x, by a movement of the bag 455, which is at a level N1 in the release position F403. Once the insertion movement has been completed and the mobile telephone 403 is in the charging position L403, then the mobile telephone 403 is lowered to a level N4, and the bag 455 is lowered to a level N2. The charging position L403 therefore forms a first secondary position S1 for the mobile telephone 403 and for the holding device 405. For insertion from the release position F403 in the arrow direction x into the charging position L403, and for removal from the charging position L403 in an arrow direction x' to the release position F403, the flap 452 is in each case opened by an automatic mechanism, which is not illustrated, or by the contact with the mobile telephone 403. The mobile telephone 403 can be removed from the release position F403 by hand, with the flap 452 being closed once the mobile telephone 403 has been removed. Conversely, the mobile telephone 403 is likewise set to the release position F403 by hand, with the mobile telephone 403 in this case being inserted into the slot 451 and being placed on the bag 455. In order to ensure optimum contact of a lower face 456 of the mobile telephone 403, toward which a secondary coil 416 of the mobile telephone 403 is positioned, the mobile telephone 403 is pushed against the charging surface 406 on an upper face 457 by means of a pressure device 458. The pressure device 458, which is a component of the holding device 405, comprises a roller 459 which is pressed by a lever 460 with a force F459 onto the upper face 457 of the mobile telephone 403. The roller 459, which can rotate and rolls on the upper face 457 of the mobile telephone 403 while the latter is being inserted and withdrawn ensures freedom of movement and easy handling of the mobile telephone 403. Support of the mobile telephone 403 in the charging position L403 is also ensured by the mobile telephone 403 being inclined through an angle $\alpha=15°$ from a vertical S in the direction of travel F in the charging position L403 and in the insertion direction x and the removal direction x', and by its lower face 456 resting on a vibration-damping material 461 which prevents sliding. In particular, this efficiently prevents the mobile telephone 403 from being tilted away laterally with respect to the direction of travel F, or from being tilted back when powerful acceleration occurs, in particular such that, even when turning, this ensures that energy is transmitted with constant quality from a primary coil 407 of the charging device 404 to the secondary coil 416 of the mobile telephone 403. A base U, which is formed by the vibration damping material 461, is also a component of the holding device 405. The movable bag 455 comprises a coupling 462 with a threaded hole 463 which interacts with a spindle 464, with the spindle 464 being driven by an electric motor 465, and with its longitudinal axis L464 being aligned parallel to the arrow direction x or x', in which the bag 455 and the mobile telephone 403 move during insertion. The bag 455 can be moved as desired by this spindle drive SA1, and is suitable for holding different mobile telephones. These are held securely in the charging position L403, since the bag 455 interacts with the pressure device 458 and the base U in order to fix the respective mobile telephone. In order to ensure an optimum charging process, provision is made for the respective mobile telephone with the bag 455 to be lowered to a level which is specifically suitable for the mobile telephone. By way of example, provision is made for movement with the bag 455 to a level N5 instead of to the level N2, when the mobile telephone to be charged is, for example, shorter than the mobile telephone 403 shown in FIG. 22, or when the secondary coil of the mobile telephone to be charged is arranged differently than that in the case of the mobile telephone 403 shown in FIG. 22. The mobile telephone 403 and the charging device 404 would then be at the level N5 in a second secondary position S2. There are a multiplicity of further secondary positions between the secondary positions that have been mentioned. The use of a self-locking spindle drive allows the secondary position selected for the mobile telephone 403 and the holding device 404 to also be maintained in the event of shaking and dynamic loads.

As can be seen from the further section shown in FIG. 23, the charging device 404 is also designed to be movable by an electric motor or motors for an optimum energy supply to the mobile telephone 403. For this purpose, the primary coil 407 is arranged on a carriage 419 which has a threaded hole 466 and can be moved on a spindle 467, with the spindle being driven by a further electric motor 468. The longitudinal axis L467 of the spindle 467 runs parallel to the charging surface 406 and transversely with respect to the longitudinal axis L464 of the spindle 464 for driving the bag 455 (see also FIG. 22). Therefore, the primary coil 407 can be moved with the aid of the spindle drive SA2 on a primary plane PE, which is defined by the arrow directions x and y, from an illustrated center position M404, which represents a first primary position P1, transversely with respect to the arrow direction x or x' and in the arrow direction y or y', by movement distances w2, w3 to a second primary position P2, which is indicated in the drawing, and a third primary position P3, which is indicated in the drawing. There are a plurality of further primary positions between the primary positions P1 and P2 as well as P1 and P3, and these could be moved to as required. The use of a self-locking spindle drive allows the primary position which has been selected for the primary coil 407 to be maintained even in the event of shaking and dynamic loads. In this case, energy is supplied to the primary coil 407 via a flexible cable 469. This allows the position of the primary coil 407 to be optimized to the various positions which the secondary coil in the various mobile telephones for which the device 414 is suitable assumes in different charging positions. The primary positions and the secondary positions can thus be matched to one another in an xy coordinate system by movement of the bag and/or of the primary coil 407, in order to ensure optimum energy transmission. In this case, the present invention provides for the primary position to be automatically matched to the secondary position by electronic open-loop control or electronic closed-loop control, or for the user to be provided with information, in particular in visible and/or audible form, for optimization of the alignment of the primary coil and/or of the mobile telephone and of the holding device. In particular, the present invention provides for the respective mobile telephone to be moved to the respectively intended charging position, and for the primary coil then to be aligned with the secondary coil of the mobile telephone.

The present invention is not restricted to illustrated or described exemplary embodiments. In fact, it covers developments of the present invention within the scope of the patent claims.

<center>LIST OF REFERENCE SYMBOLS</center>

1 Charging arrangement
2 Mobile electronic appliance
3 Mobile telephone
4 Charging device
5 Holding device
6 Charging surface
6a Lower face of 6
6b Upper face of 6
7 Primary coil
8a-8d Holding jaw
9 Frame
10 Link
11a-11b Spring element of 10
12a-12d Spring element of 8a, 8b, 8c and 8d respectively
13 Longitudinal axis
14 Device
15 Vehicle
16 Secondary coil
17 Electronics
18 Rechargeable battery
19 First carriage
21 Toothed rod
22 Strip
23 Base body of 19
24 Key of 19
25 Toothed strip of 19
26 Slider of 19
27a, 27b Spring element of 19
27b Spring element of 19
28 Aperture in 19
29 Second carriage
30 Spindle
31 Spindle nut
32 Rotation axis of 30
33 Knurled nut
34 Spindle drive
35 Recess
36a-36c Holding socket for 7
37a-37b Latching spring of 7
38a, 38b Latching tab of 37a and 37b respectively
39a, 39b Undercut in 36c
40 Cable
41a, 41b Channel between 36a, 36b and 36b, 36c, respectively
101 Charging arrangement
103 Mobile telephone
104 Charging device
105 Holding device
106 Charging surface
107 Primary coil
109 Frame
114 Device
116 Secondary coil
201 Hole
202 Jaw
203 Jaw
205 Spindle
206 Spindle
207 Spindle drive
208 Spindle drive
301 Charging arrangement
303 Mobile telephone
304 Charging device
305 Holding device
306 Charging surface
307 Primary coil
309 Frame
314 Device
316 Secondary coil 401 Charging arrangement
402 Mobile electronic appliance
403 Mobile telephone
404 Charging device
405 Holding device
406 Charging surface
406b Upper face of 406
407 Primary coil
414 Device
416 Secondary coil
419 Carriage
450 Holding area
451 Slot
452 Flap
453 Closed position of 452
454 Electrical push button
455 Bag
456 Lower face of 403
457 Upper face of 403
458 Pressure device
459 Roller
460 Lever
461 Vibration Damping Material
462 Coupling
463 Threaded hole
464 Spindle
465 Electric motor
466 Threaded hole
467 Spindle
468 Further electric motor
469 Flexible cable
A1, A2 Output device
a, b Movement distance between P1 and P2
B414 Bottom face of 414
BD Figure display on D
B3 Width of 3
D Display
F Direction of travel
F403 Release position for 403
F414 Front face of 414
F459 Force of 459
G Housing
L3 Length of 3
L403 Charging position of 403
L464 Longitudinal axis of 464
L467 Longitudinal axis of 467
M404 Center position of 404
MK1-MK3 Marking
P1-P3 First to third primary positions
PE Primary plane
R1-R4 Direction arrow
RS3 Rear face of 3
S Vertical
SA1, SA2 Spindle drive
S1, S2 First, second secondary positions
T1 Electrical push button
U Base
w1 Movement distance of 403, 405 or 455
w2, w3 Movement distance of 404
x, x' Spatial direction
y, y' Spatial direction
α Angle between S and x or x'

The invention claimed is:

1. A charging arrangement for a vehicle comprising:
an inductively chargeable mobile electronic appliance of a plurality of different, inductively chargeable, mobile electronic appliances having a secondary coil for charging electronics and a rechargeable battery of the electronic mobile appliance; and
a charging device having a primary coil and a charging surface which is associated with the primary coil and above which the mobile electronic appliance can be positioned for charging,
wherein the primary coil is positioned in a first primary position and in at least one second primary position on a primary plane relative to the charging surface for optimum alignment between the primary coil and the secondary coil for energy transmission to the secondary coil, with the primary coil being fixed in a chosen primary position independent of shaking, vibrations and centrifugal forces acting on the charging arrangement, and independent of a presence of the mobile electronic appliance.

2. The charging arrangement according to claim 1, wherein the charging arrangement comprises a holding device in which the respective mobile electronic appliance is held and is fixed above the charging surface, with the rear face of the mobile electronic appliance resting on the charging surface.

3. The charging arrangement according to claim 1, wherein the primary plane is aligned parallel to an upper face of the charging surface.

4. The charging arrangement according to claim 1, further comprising:
at least one carriage on which the primary coil is arranged;
said primary coil being movable together with the respective carriage from the first primary position to the at least one second primary position, and being fixable there;
a toothed rod, wherein the first carriage is movable linearly together with the primary coil along the toothed rod and is connected in an interlocking manner to the toothed rod in at least two carriage positions;
a first carriage having teeth which are matched in particular to the toothed rod, and are pressed against the toothed rod by a spring element,
wherein the first carriage can be decoupled from the toothed rod and can be moved against a force of the spring element by operation of a key which is connected to the carriage, and
wherein the first carriage is supported by a slider on a strip which is opposite the toothed rod.

5. The charging arrangement according to claim 4, further comprising:
a second carriage supporting the primary coil which is arranged such that it can be moved on and can be fixed with respect to the first carriage,
wherein the first carriage is movable in a first spatial direction and the second carriage is movable relative to the first carriage in a second spatial direction, and the first spatial direction and the second spatial direction are aligned orthogonally with respect to one another and parallel to the primary plane,
wherein the second carriage is movable relative to the first carriage by means of a drive which is fixed to the first carriage, the drive being in the form of a self-locking spindle drive,
wherein a spindle of the spindle drive is mounted on the first carriage such that it can rotate and cannot be moved linearly,
the second carriage being connected to the spindle by means of a spindle nut, with the second carriage being guided on the first carriage, and
the spindle having an operating end.

6. The charging arrangement according to claim 1, wherein the charging surface has one of (i) at least one recess in which the primary coil can be fixed in at least two primary positions, and (ii) at least two recesses into which the primary coil can be inserted in at least one primary position.

7. The charging arrangement according to claim 1, wherein the efficiency of the energy transmission from the primary coil of the charging device to the secondary coil of the mobile electronic appliance can be signalled at an output device in at least two states, in order to signal at least one of an assessment of the position of the primary coil, and a recommendation for movement of the primary coil during a charging operation.

8. The charging arrangement according to claim 1, wherein at least one of the primary coil, the first carriage and the second carriage can be moved one of manually and by one or more motors.

9. The charging arrangement according to claim 1, wherein at least one of the mobile electronic appliance and the charging device further comprises an output device.

10. The charging arrangement according to claim 9, wherein the output device indicates by means of a signal the direction in which the primary coil should be moved to improve the efficiency of the inductive transmission of electrical energy.

11. The charging arrangement according to claim 1 further comprising a holding device, with the holding device being movable by at least one electric motor, by means of a spindle drive to a release position for removal of the electronic appliance and at least one charging position for charging of the electronic appliance, with the charging device being movable with the primary coil, by means of a spindle drive orthogonally with respect to the holding device.

12. The charging arrangement comprising;
    an inductively chargeable mobile electronic appliance having a secondary coil for charging electronics and a rechargeable battery of the mobile electronic appliance, wherein the secondary coil is arranged in a fixed position in the mobile electronic appliance;
    a charging device having a primary coil and a charging surface which is associated with the primary coil, wherein the primary coil is positioned in a first primary position and in at least one second primary position on a primary plane relative to the charging surface for optimum alignment between the primary coil and the secondary coil for energy transmission to the secondary coil; and
    a holding device in which the mobile electronic appliance is held, wherein the mobile electronic appliance is one of (i) selectively fixable in the holding device relative to the charging surface of the charging device in a first shaking-resistant secondary position and at least one second shaking-resistant secondary position, and (ii) selectively fixable together with the holding device relative to the charging surface of the charging device in a first shaking-resistant secondary position and in at least one second shaking-resistant secondary position.

13. The charging arrangement according to claim 12, wherein the mobile electronic appliance can be one of moved in the holding device in at least one spatial direction from the first shaking-resistant secondary position to the at least one secondary shaking-resistant position, and moved together with the holding device in at least one spatial direction from the first shaking-resistant secondary position to the at least one second shaking-resistant secondary position.

14. The charging arrangement according to claim 13, wherein one of the mobile electronic appliance and the holding device with the mobile electronic appliance can be moved one of manually and by one or more motors.

15. The charging arrangement according to claim 12, wherein an output device indicates by means of a signal the secondary position to which the secondary coil should be moved to improve the efficiency of the inductive transmission of electrical energy.

* * * * *